US009879466B1

(12) United States Patent
Yu

(10) Patent No.: US 9,879,466 B1
(45) Date of Patent: Jan. 30, 2018

(54) GARAGE DOOR CONTROLLER AND MONITORING SYSTEM AND METHOD

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 15/490,826

(22) Filed: Apr. 18, 2017

(51) Int. Cl.
*G07C 9/00* (2006.01)
*E05F 15/76* (2015.01)
*G06K 9/46* (2006.01)
*E05F 15/73* (2015.01)
*H04W 4/02* (2009.01)

(52) U.S. Cl.
CPC ............ *E05F 15/76* (2015.01); *G06K 9/4604* (2013.01); *G07C 9/00087* (2013.01); *G07C 9/00119* (2013.01); *E05F 2015/763* (2015.01); *E05F 2015/767* (2015.01); *G06K 2209/15* (2013.01); *H04W 4/021* (2013.01)

(58) Field of Classification Search
CPC ......... E05F 15/76; E05F 15/77; G06K 9/4604
See application file for complete search history.

(56) References Cited

U.S. PATENT DOCUMENTS

| 2002/0014954 A1* | 2/2002 | Fitzgibbon ......... G07C 9/00182 340/5.64 |
| 2002/0183008 A1* | 12/2002 | Menard ............. G07C 9/00182 455/66.1 |
| 2016/0148451 A1* | 5/2016 | Menkveld .......... G07C 9/00126 340/5.71 |
| 2016/0258202 A1 | 9/2016 | Scalisi |
| 2017/0107752 A1* | 4/2017 | Dvir ..................... H04L 67/125 |

* cited by examiner

*Primary Examiner* — Nabil Syed

(57) ABSTRACT

A GDCM device having a processor coupled to the at least one memory, at least one connection terminal, a network module coupling the GDCM device to a local wireless network, the at least one connection terminal communicably coupled to at least one garage door opener, and the processor configured to cause an action based on a determination of the proximity of a transmitter to the at least one garage door opener, the proximity of the transmitter being determined using at least one of geofencing technology, image recognition technology or voice recognition technology, the GDCM device coupling magnetically to the at least one garage door opener and having a plurality of sensors for distinguishing individual and vehicle, the GDCM performing one or a plurality of actions sequentially or simultaneously on a single or plurality of garage door openers.

21 Claims, 11 Drawing Sheets

GARAGE DOOR CONTROLLER AND MONITORING SYSTEM AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15488211 filed on Apr. 14, 2017; and entitled AN INTERACTIVE AUGMENTED-REALITY IoT DEVICES SYSTEMS AND METHODS.

FIELD

The present disclosure generally relates to garage doors controllers, more particularly to garage door controllers for monitoring and controlling a garage door.

BACKGROUND

In the active and sometimes hectic world we live in, many residents tend to forget to close their garage door as they leave or enter a building. Some garage door controller systems require additional accessories such as a hub or bridge to connect to a local wireless network, or a specific setup to work with existing garage door openers. Other garage door controller systems require a wall mount installation making it burdensome to install and position for unobstructed views. Moreover, a camera of such garage door controller systems cannot be adjusted to provide enough visual detail for enhancing a user experience. Thus, current garage door controller systems are not easily integrated into current garage door openers and do not provide users with adequate information to automate and simplify the use of their garage door opener and to provide residents with more functionality and convenience in their day to day usage.

SUMMARY

The disclosed subject matter relates to a garage door controller and monitoring (hereinafter, "GDCM") device and method. The GDCM device having at least one connection terminal communicably coupled to at least one garage door opener and can share an existing connection between the at least one garage door opener and a manual switch of the garage door opener to maintain the existing manual switch operation of the garage door opener. The GDCM includes a magnetic base for conveniently installing to any garage door or any part of the garage door, for example, any part of the track or rail of the at least one garage door opener.

The GDCM device further includes a network module wirelessly coupling the GDCM device to a local wireless network, a processor and a storage or memory device, the processor configured to process instructions stored on the storage or memory device. The GDCM device further includes a plurality of sensors (e.g. a camera, speaker, microphone) for collecting visual, motion, and audio information and facilitating communication between the transmitter and individual(s) or object(s) positioned within a vicinity of the GDCM device.

The plurality of sensors of the GDCM devices configured to determine the proximity or location of a transmitter to the GDCM device, using, for example, geofencing technology, image recognition technology, or voice recognition technology. When the transmitter is within a predetermined distance from the GDCM device, the processor performs, for example, an action of moving the at least one garage door opener to an open position.

The GDCM device is further communicably coupled to a server through the local wireless network. The server is configured, for example, to further aid the GDCM device in determining the proximity of the transmitter to the GDCM device using geofencing technology, image recognition technology, or voice recognition technology. The processor of the GDCM device is configured to wirelessly communicate with a plurality of smart devices communicably coupled to the local wireless network or positioned within a vicinity of the GDCM device. The processor used together with the server may notify a transmitter of an event or trigger captured by the smart device. The processor provides the server with collected visual, textual, audio, or motion information, and the processor receives instructions from the server, in response to the communicating the collected information to the transmitter.

The GDCM device may simultaneously control a single garage door opener or multiple garage door openers to open or close using a single or two finger swipe down or up swipe over a live image of the garage doors on the transmitter.

The disclosed subject matter further relates to a method of connecting at least one connection terminal of a GDCM device to at least one garage door opener, connecting the GDCM device to a local wireless network, determining a proximity of a transmitter to the at least one garage door opener, and performing an action based on the determining of the proximity of the transmitter of, for example, moving the at least one garage door opener to an open position, a closed position, a partially open position or partially closed position. The GDCM device may be magnetically coupled to any portion of the garage door or a bottom surface, track, or rail of the at least one garage door opener. Moreover, the method further comprises controlling a plurality of garage door openers by performing actions on, for example, the transmitter to control the plurality of garage door openers.

The method further includes determining the proximity of the transmitter using at least one of geofencing technology, image recognition technology or voice recognition technology, and acquiring vehicle information and individual information. The vehicle information includes at least a license plate number, and the individual information includes at least a portion of the individual's torso and head.

The method further comprises comparing the vehicle information or the individual information against a database of stored vehicle and individual information on the server or an at least one memory of the GDCM device.

The disclosed subject matter further relates to a non-transitory machine-readable medium comprising instructions stored when executed by one or more processors of a processing system cause the one or more processors to perform operations of determining a proximity of a transmitter to at least one garage door opener using at least one of geofencing technology, image recognition technology or voice recognition technology, and performing an action based on the determining of the proximity of the transmitter. The action being at least one of moving a garage door opener to an open position, a closed position, a partially open position or partially closed position.

The non-transitory machine-readable medium may contain additional operations such as acquiring vehicle information or individual information. The vehicle information including at least a license plate number, and the individual information including at least a portion of the individual's torso and head. Then comparing the vehicle information or the individual information against a database of stored vehicle and individual information on a server or an at least one memory of a GDCM device. The GDCM device may be connected to the at least one garage door opener by coupling magnetically the GDCM device to a bottom surface, the track, or the rail of the at least one garage door opener.

The non-transitory machine-readable medium may further contain additional operations of performing actions simultaneously on a plurality of garage door openers.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

Figure 1:
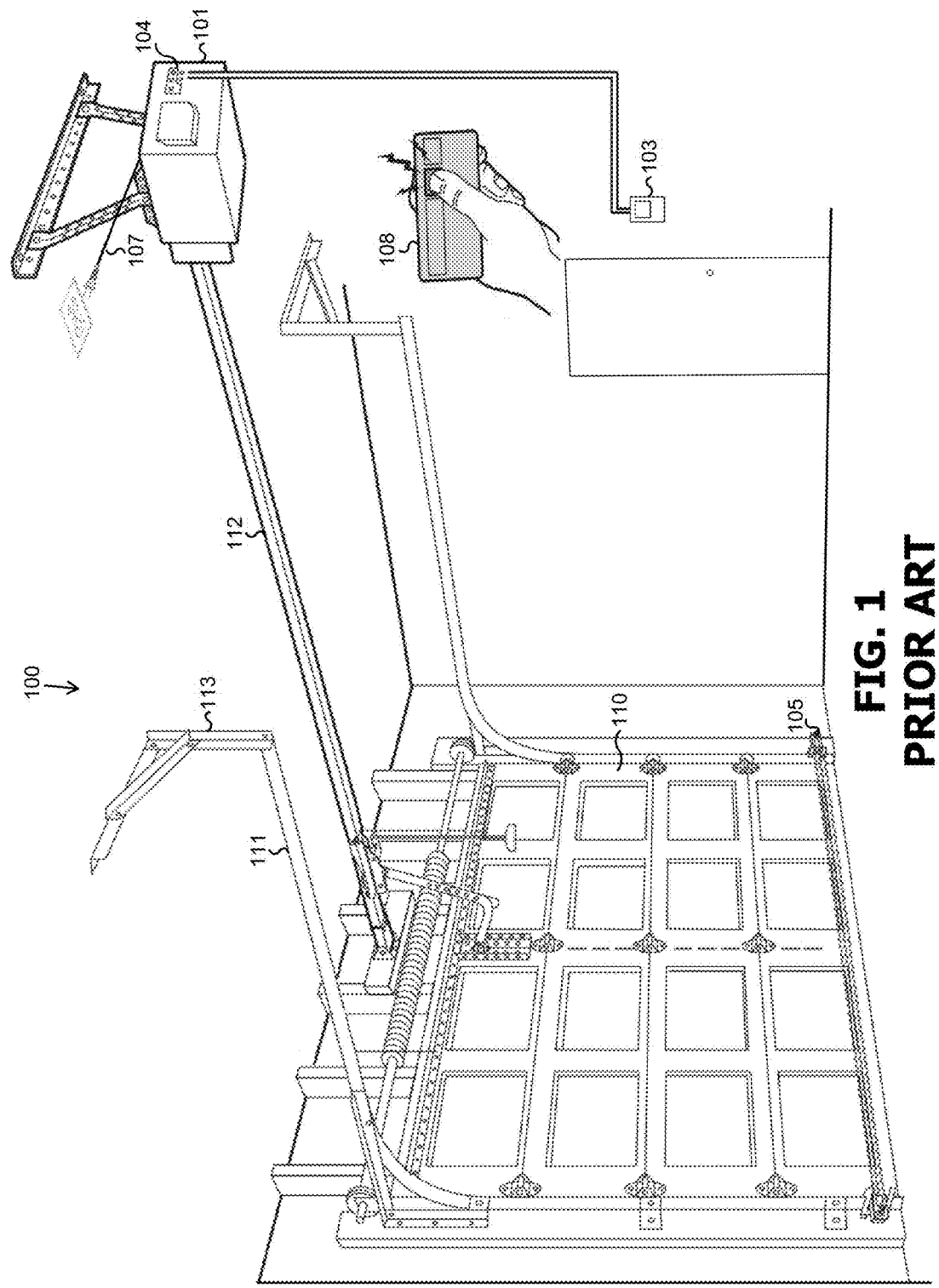
FIG. 1 illustrates a prior art implementation of a garage door system.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Various features of the present disclosure will now be described, and is not intended to be limited to the embodiments shown herein. Modifications to these features and embodiments will be readily apparent to those skilled in the art, and the principles defined herein may be applied to other embodiments without departing from the scope of the disclosure.

PRIOR ART

FIG. 1 illustrates a prior art implementation of a garage door system. The prior art garage door opener system 100 includes a garage door opener 101 having a power supply cable 107 connected to a power source such as a wall outlet, and connection terminals 104 for connecting to a garage door sensor 105 and a wall mounted door switch 103 to operate a garage door 110. The garage door opener 101 may also include a garage door remote controller 108 for remotely operating the garage door 110. The garage door opener system 100 includes track hangers 113 to support the garage door 110, and a track 112 and rails 111 on which the garage door slides or moves on to an open, closed, or partially opened position, as well as other various components (not labeled) for operation such door panels, cable drum, torsion springs, and brackets.

[Garage Controller and Monitoring System Physical Installation]

Figure 2:
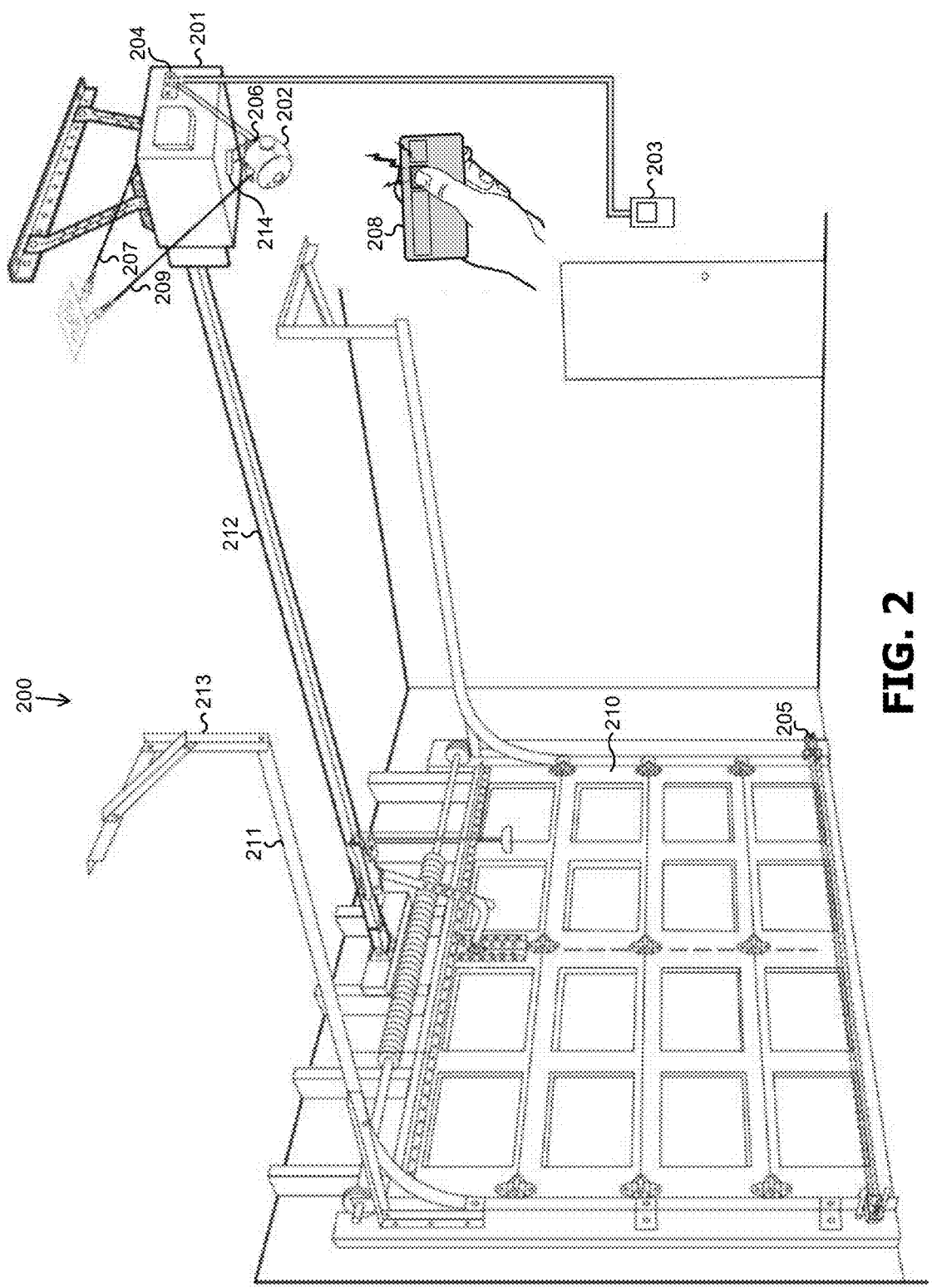
FIG. 2 illustrates an exemplary embodiment of an installation of the garage door controller and monitoring (GDCM) system.

Turning now to an exemplary embodiment of the present disclosure, FIG. 2 illustrates an exemplary implementation of the GDCM system 202. The garage door opener system 200 includes a GDCM system 202, a garage door opener 201, track hangers 213 to support a garage door 210, a track 212 and rails 211 on which the garage door slides or moves on towards an open, closed, or partially opened position, as well as other various other components (not labeled) for operation such door panels, cable drum, torsion springs, and brackets.

The GDCM system 202 includes a magnetic base 214 for conveniently installing to any part of the garage door system 200, for example, any part of the rail 211, track 212, and track hangers 213. The GDCM system 202 includes a power supply cable 209 connected to a power source such as a wall outlet, and at least one connection terminal 206 for connecting to the garage door opener 201. The garage door opener 201 includes a power supply cable 207 connected to a power source such as a wall outlet, a garage door remote controller 208 for remotely operating the garage door 210, and connection terminals 204 for connecting to the GDCM system 202, a garage door sensor 205, and a wall mounted door switch 203.

[Garage Controller and Monitoring System Connection to Garage Opener]

Figure 3:
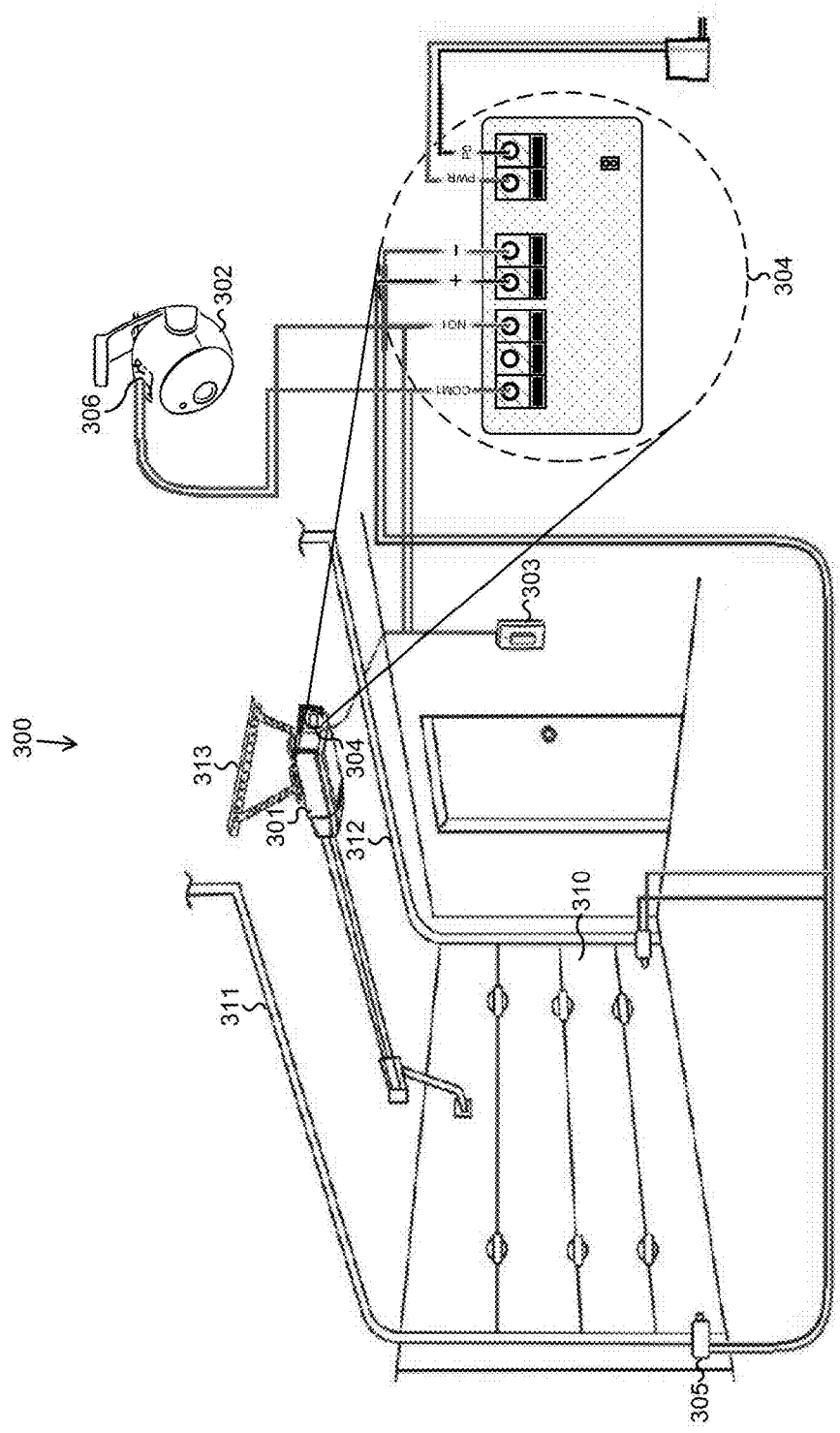
FIG. 3 illustrates an exemplary embodiment of a wiring configuration for the GDCM system of FIG. 2.

FIG. 3 illustrates an exemplary embodiment of the GDCM system 302 installation in an exemplary garage door opener system 300 in accordance with one or more embodiments of the present disclosure. Not all depicted components may be required. One or more implementations may require additional components, fewer components, or different components not shown in FIG. 3. As shown in FIG. 3, with the addition of the GDCM system 302, the garage door 310 and garage door opener 301 operate as originally installed for the resident. The garage door sensor 305 and manual switch 303 connections to the connection terminals 304 of the garage door opener 301 remain the same.

The exemplary embodiment of the garage door opener system 300 includes a GDCM system 302 having at least one connection terminal 306 for electrically coupling to the garage door opener 301. As shown in FIG. 3, the at least one connection terminal 306 may include two connection terminals, one terminal electrically connecting to a communications port (COM) of the garage door opener 301, and another terminal electrically connecting to a GND port of the garage door opener 301.

The connection terminal 306 of the GDCM system 302 may also function with other devices sharing a COM port and GND port connection to maintain the existing functionality of the garage door opener 301. For example, the GDCM system 302 may be implemented to cooperate with a manual switch 303. In such as case, the connection terminals 306 electrically couple to the manual switch 303 (e.g. forming a twisted pair) while maintaining operation of the manual switch 303. The GDCM system 302 may function with existing garage door opener configurations and does not require modifications to the garage door, garage door opener, or garage door opener components and accessories.

[Binary, Ternary, and Other Coding Systems]

The garage door may be defined as any movable barrier, and similarly the garage door opener may be defined as a movable barrier operator. Various movable barrier operators are known in the art. Movable barrier operators facilitate control and movement of single panel, multi-panel, and segmented garage doors, pivoting, rolling, and swinging gates, guard arms, rolling shutters, and various other movable barriers.

Generally, the garage door opener functions in response to a control signal transmitted by a manual switch or an RF transmitter. As shown in FIG. 2, the garage door remote controller 208 functions as an RF transmitter for transmitting a control signal to control the garage door opener 201. The RF transmitter and garage door opener communicate based on a coding system. One known approach to supporting communication between a garage door opener and an RF transmitter makes use of ternary data (e.g. three states) coding system. Ternary data (ternary code) is transmitted from the RF transmitter to the garage door opener to open or close the garage door. In other cases, binary data (binary code) is transmitted from the RF transmitter to control the garage door opener.

The coding system for a garage door opener may be binary, ternary, quaternary, etc. and may use fixed code, non-fixed code, rolling code, encrypted or non-encrypted data transmission. The GDCM system of the present disclosure, may use any communication means to facilitate communication with the garage door opener. The communication between the GDCM system and the garage door opener may consist of the garage door opener converting the ternary data to a binary format by mapping each trit ("ternary bit") of the ternary data to a corresponding pair of binary bits. A ternary coded garage door opener may receive ternary code from the GDCM system and the garage door opener may convert the ternary code to binary code. Furthermore, the GDCM system may take a user programmed transmitter transmitting in binary fixed code and convert the binary fixed code to ternary rolling code to operate the user(s) garage door opener. The GDCM system may use any combination of one or more of the above data elements with rolling code or fixed bits, or any type of transmission and reception that may have three or more different states to operate a garage door opener.

[Garage Controller and Monitoring System Internals]

Figure 4:
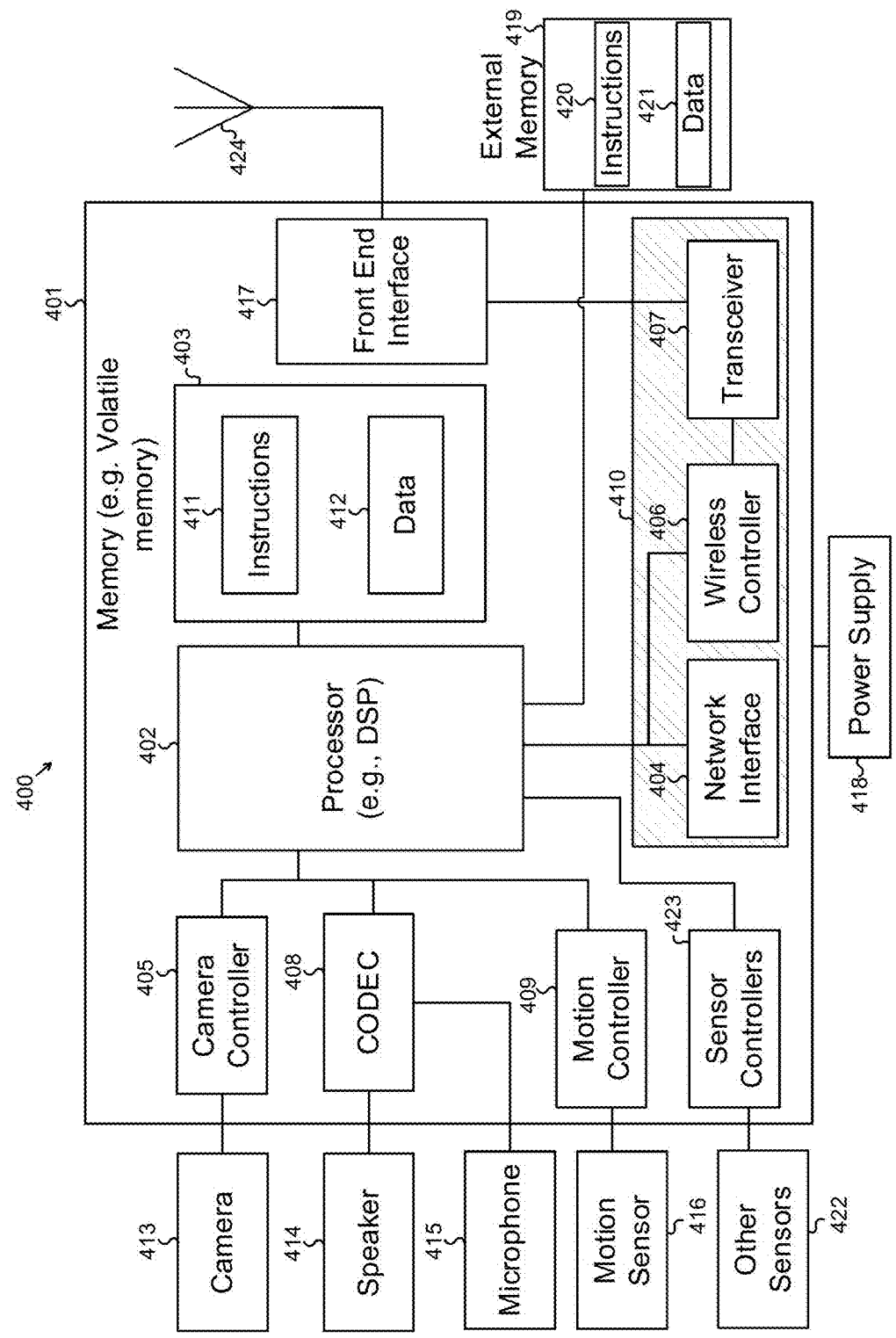
FIG. 4 illustrates an exemplary embodiment of the internal components of the GDCM system of FIG. 2.

FIG. 4 illustrates conceptually an example GDCM system 400 with which some implementations of the present disclosure may be implemented. The GDCM system 400 may be any sort of electronic device that transmits signals over a network, such as electronic devices embedded in smart appliances and other smart systems. The GDCM system 400 may include various types of computer readable media (e.g., a non-transitory computer-readable medium) and interfaces for various other types of computer readable media.

The GDCM system 400 includes a processor 402 and memory/storage 403. The processor 402 may retrieve and execute instructions 411 and/or data 412 from memory/storage 403 to perform the processes of the present disclosure. Processor 402 may be a single processor, a multi-core processor, or multiple processors in different implementations.

The memory/storage 403 may include a dynamic random-access memory (DRAM) and/or a read-only memory (ROM). Memory/storage 403 may provide a temporary location to store data 412 and instructions 411 retrieved and processed by processor 402. Memory/storage 403 may include a non-volatile read-and-write memory that stores data 412 and instructions 411, even when Wi-Fi/Internet is off, that may be retrieved and processed by processor 402. For example, memory/storage 403 may include magnetic, solid state and/or optical media, memory/storage 403 may be a single or multiple memory units as necessary. The memory/storage 403 stores all collected visual, audio, textual, voice, motion, heat, proximity, etc. information provided directly from the GDCM system 400 sensors or indirectly through a wireless connection to another electronic device or sensor.

The GDCM system 400 may further include an interface (e.g. USB or SD/MicroSD card slot) for external storage 419 of data 420 and instructions 421 for the processor 402 to retrieve and execute. The external storage 419 may include a dynamic random-access memory (DRAM) and/or a read-only memory (ROM), include a dynamic random-access memory (DRAM) and/or a read-only memory (ROM), or various types of computer readable media (e.g., a non-transitory computer-readable medium) and interfaces for various other types of computer readable media. The external storage 419 stores all collected visual, audio, textual, voice, motion, heat, proximity, etc. information provided directly from the GDCM system 400 sensors or indirectly through a wireless connection to another electronic device or sensor.

The GDCM system 400 further includes a speaker 414 and a microphone 415 for communicating with an object positioned within a vicinity of the GDCM system 400. The speaker 414 and microphone 415 may be coupled to a CODEC 408. The coder/decoder (CODEC) 408 may also be coupled to the processor 402. The processor 402 may provide audio information captured from the microphone 415 to any electronic device (e.g. a server or a smart phone) which may facilitate communication with an object positioned within a vicinity of the GDCM system 400 through the speaker 414.

In an exemplary embodiment, the GDCM system 400 comprises at least one motion sensor 416 for detecting motion information and a motion controller 409. For example, sensor 416 may perform detecting moving objects, vehicles, and/or pedestrians. The motion sensor 416 may be a passive infrared motion detector. Infrared motion sensors are also known as PIR (passive infrared) motion sensors or simply PIR sensors. Such detectors have about a 120° arc and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative types of motion detectors may also be used to sense intrusion including laser scanning or frequency sensitive detectors, commonly referred to as "glass breaks". Image sensors may include any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 416 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. a smart device or laptop). Also, a server or application may decide if the situation or application warrants night use or twenty-four-hour operation of motion detection through alternate means such as photocell sensors. If night operation is selected, then the server or application will process detected photocell information to determine if motion was detected.

The GDCM system 400 may include any number of other detectors or sensors. Examples of other sensors 422 and other sensor controllers 423 for controlling the other sensor(s) 422 to measure/detect physical quantities from the surrounding environment that will be sent to the processor 402 for processing. Other sensors 422 that may be used in the GDCM system 400 may include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The GDCM system 400 may include a camera 413 for capturing visual information such as video and still images of the surrounding environment. The camera 413 may be coupled to a camera controller 405 for controlling the camera to capture visual information that may be sent to the processor 402. The camera controller 405 may be coupled to the processor 402 for processing visual information. The processor 402 may provide visual information captured from the camera 413 to any electronic device (e.g. a server or a smart phone) which may facilitate interaction or communication with a person or an object positioned within a vicinity of the GDCM system 400. The camera 413 may be any optical instrument for recording or capturing images that may be stored locally, transmitted to another location, or both. The images may be still photographs, or sequences of images forming videos or movies. The camera 413 may be any type of camera, for example, high-end professional camera type, digital camera, panoramic camera, fish-eye lens type camera, multi-lens type camera, VR camera, etc.

The GDCM system 400 may include a transceiver 407, and the processor 402 may be coupled to a computer-readable storage medium, such as a memory 403 (e.g., a non-transitory computer-readable medium) or to external memory 419, through the transceiver 407. The transceiver 407 may correspond to a transmitter and transceiver. Moreover, the processor 402 may be external transceiver 407. For example, the processor 402 may be "off-chip" with respect to the transceiver 407. FIG. 4 also indicates that a wireless controller 406 may be coupled to the processor 402. The wireless controller 406 may be further coupled to an antenna 424 through the transceiver 407. In another embodiment, the processor 402 and the transceiver 407 are integrated within a system-in-package or system-on-chip device 401, as explained further below.

In an exemplary embodiment, the processor 402, the memory 403, the camera controller 405, the CODEC 408, the motion controller 409, sensor controllers 423, the wireless controller 406, and the transceiver 407 are included in the system-in-package or system-on-chip device 401. A power supply 418 may be coupled to the system-on-chip device 401. Moreover, in an exemplary embodiment, the camera 413, the speaker 414, the microphone 415, the antenna 424, and the power supply 418 are external to the system-on-chip device 401. However, each of the camera 413, the speaker 414, the microphone 415, the antenna 424, and the power supply 418 may be coupled to a component of the system-on-chip device 401. As an example, the processor 402 and the memory 403 are coupled to transceiver 407. The GDCM system 400 may further include a Global Positioning System (GPS) and/or a Bluetooth (BT)/BLE transceiver.

Figure 5A:
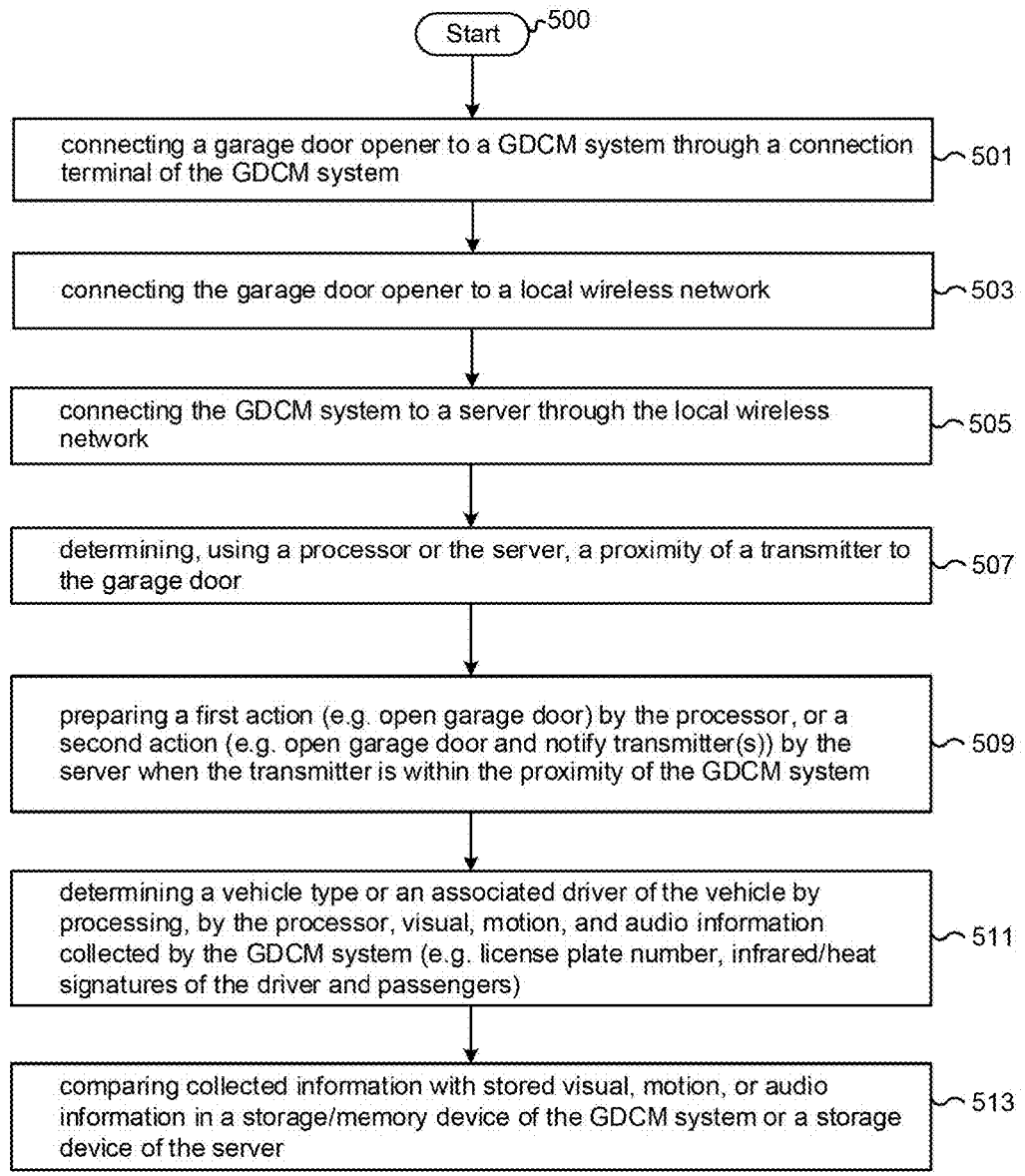
FIG. 5A illustrates an exemplary embodiment of a flowchart of server/user interactions based on image recognition, proximity detection, and geofencing for the GDCM system of FIG. 2.
Figure 5B:
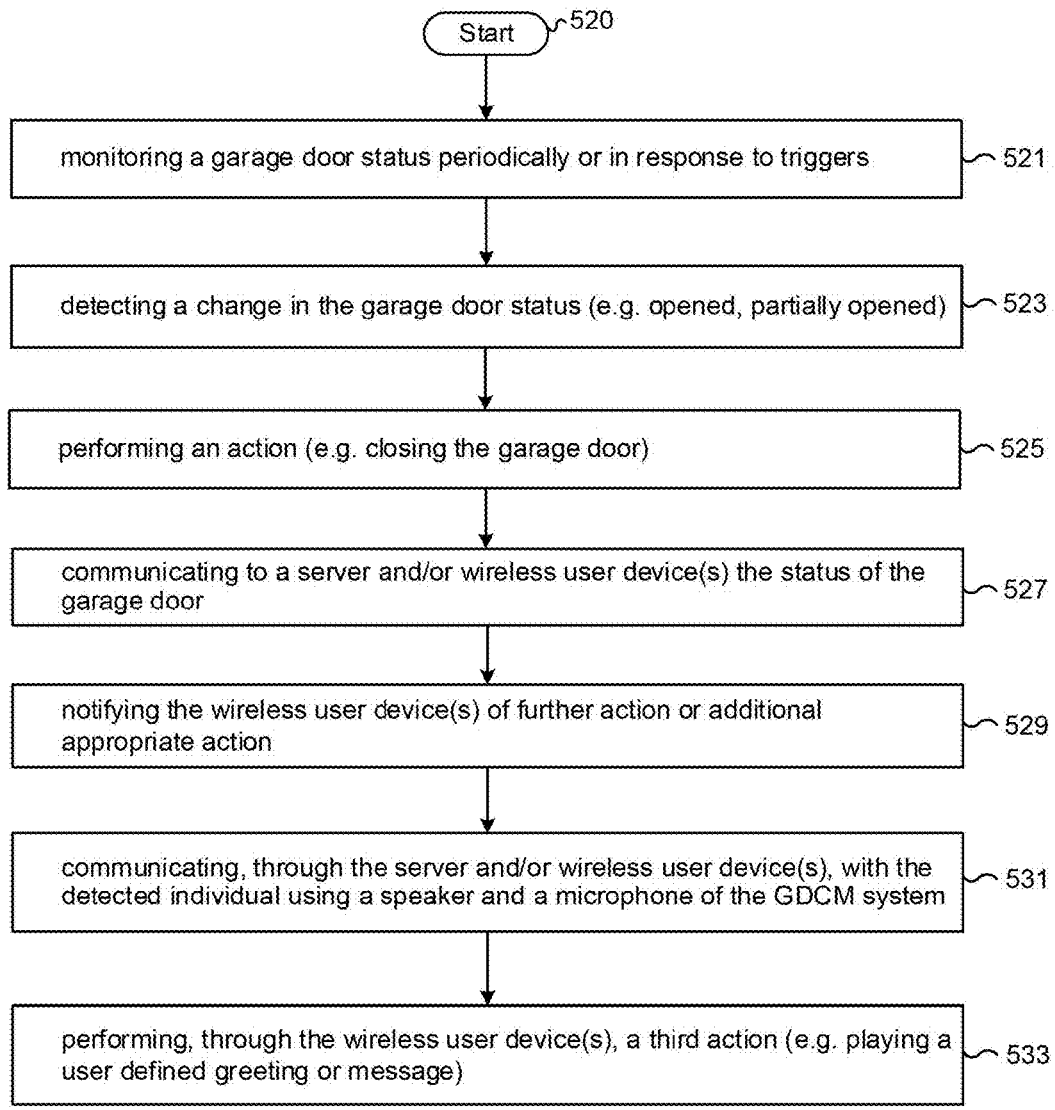
FIG. 5B illustrates an exemplary embodiment of a flowchart of server/user interactions based on triggers for the GDCM system of FIG. 2.
Figure 5C:
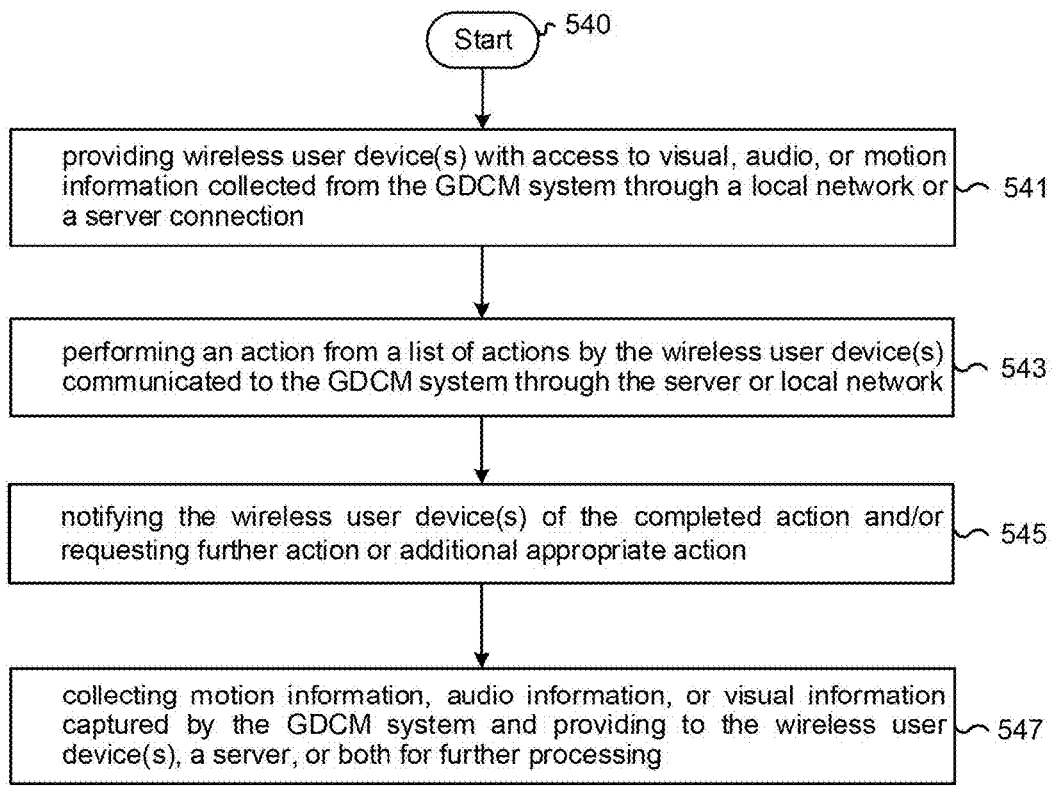
FIG. 5C illustrates an exemplary embodiment of a flowchart of user instantiated interactions with the GDCM system of FIG. 2.

Moreover, a computer-readable storage medium (e.g., the memory 403 or external memory 419) stores data (e.g., the data 412, or data 421) that is accessible to a processor (e.g., the processor 402) during modes of operation of transceiver 407. The data 412 may be a method instruction as depicted in FIGS. 5A-5C. The method instructions are executable by processor 402, where the instructions include steps on how to operate and configure the transceiver 407.

Lastly, GDCM system 400 couples to a network through a network interface 404. In some aspects, network interface 404 is a machine-interface. In this manner, the GDCM system 400 may be a part of a network of computers, a local area network (LAN), a wide area network (WAN), or an Intranet, or a network of networks, for example, the Internet. Any or all components of GDCM system 400 may be used in conjunction with the subject disclosure. The network interface 404 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The network module 410 may integrated as system-in-package or system-on-chip device and/or collectively defined as having the network interface 404, wireless controller 406, and transceiver 407.

[Garage Controller and Monitoring System Method]

FIGS. 5A-C illustrate exemplary methods of operating a GDCM system. These exemplary methods are provided by way of example, as there are a variety of ways to carry out these methods. Each block shown in FIGS. 5A-5C represents one or more processes, methods or subroutines, carried out in the exemplary method. FIGS. 3-4 and 6-9 show exemplary embodiments of carrying out the methods of FIGS. 5A-5C for collecting and processing information. The exemplary method may begin at block 500.

Referring to FIG. 5A, the exemplary method of using the GDCM system (e.g. for proximity detection) begins at block 500, followed by block 501 of connecting at least one garage door opener 301 to the GDCM system through an at least one connection terminal 306 of the GDCM system. The GDCM system may include various means of physical (e.g. 1-wire, 2-wire, 3-wire, etc.) or wireless (e.g. a dongle, or an RF transmitter) connection to the garage door opener (as shown in FIG. 3) to facilitate remote operation of the garage door opener.

In block 503, the process continues with connecting the at least one garage door opener to a local wireless network through, for example, the network module 410 of the GDCM system. The GDCM system may connect to a network of computers or smart devices 806, a local area network (LAN), a wide area network (WAN), or an. Intranet, or a network of networks, for example, the Internet.

In block 505, the GDCM system is connected to a server 804 through the local network connection. The processor 402 of the GDCM system may use the network module 410 to establish and save a single connection or multiple means of connecting to the server 804 (e.g. using WiFi, cellular connection, or by using any IEEE 802.11 standard). Moreover, a transmitter 603 (e.g. smart phone, smart device, or portable device) or wireless user device may facilitate connection of the GDCM system to a server 804.

In block 507, the proximity of the transmitter 603 to the GDCM system may be determined using either the processor 402 of the GDCM system or the server 804. The processor 402 of the GDCM system may use the network module 410 to communicate with the transmitter 603 to determine the proximity of a transmitter 603 (e.g. smart phone, smart device, or portable device) to the GDCM system. The transmitter 603 may be connected to the GDCM system through the same local wireless network (e.g. WiFi™), or it may be indirectly connected to the GDCM system through an application. The GDCM system may determine the proximity of a transmitter 603 using, for example, the transmitter 603 WiFi™ location or GPS location. Moreover, the transmitter 603 may use any wireless communication means (e.g. Radio Frequency, or Bluetooth, etc.) to communicate with the GDCM system.

As will be described below, stored visual, motion, and audio information may be used by the GDCM system, in addition to proximity information, connectivity or system information of the transmitter 603, to distinguish the individual(s) or transmitter(s).

Once the server 804 is communicatively coupled to the GDCM system through the local wireless network, the server 804 may determine the proximity of the transmitter 603 to the GDCM system using any wireless communication means (e.g. proximity of the transmitter 603 through cellular internet connection) to determine the location of the transmitter 603. The transmitter 603 connection to the GDCM system may serve to compliment the server 804 and/or supplant the server 804 when a server 804 connection cannot be made or the internet is off/down. The processor 402 response to determining the proximity of the transmitter 603 may also serve to be an immediate response or added failsafe operation, and may comprise of a single action, set of actions, or list or blend of actions processed and performed by the GDCM system processor 402.

In block 509, after the processor 402 determines the proximity of the GDCM system to the transmitter 603, the processor 402 prepares and executes a first action. For example, the processor 402 may open the garage door after determining a transmitter 603 is within a proximity of the garage door, and notifying the transmitter 603 the action has been completed (e.g. the garage door has opened). Similarly, once the transmitter 603 is within a proximity of the garage door, the server 804 may prepare a second action separate from, or in addition to, the action of the processor 402. The second action is sent by the server 804 to the GDCM system to be performed by the processor 402 of the GDCM system.

In block 511, visual, motion, and audio information collected by the GDCM system is processed by the processor 402 to determine the type of vehicle 740, the driver 744, and passenger(s) 745. The GDCM system may collect any visually distinguishable feature of a vehicle 740 such as license plate number, color, height, vehicle logo/brand, etc. The GDCM system may further collect any visually distinguishable feature of the driver or passenger(s) such as facial features, infrared/heat signatures, etc. The collected visual, motion, and audio information may be used by the processor 402 to determine the individual(s) or transmitter(s). The processor 402 may send the collected visual, motion, and audio information to the server 804 for further processing, monitoring, and visual analytics. In the case where a connection cannot be made to the server 804, the processor 402 processes the collected audio, visual, and motion information from the microphone 415, camera 413, and motion sensors 416 and attempts to determine, based on stored information, the individual(s) or transmitter(s). The proximity of the transmitter 603 may be determined using any combination of geofencing technology, image recognition, voice recognition, etc.

In block 513, the collected audio, visual, and motion information is compared with stored information in the GDCM system (e.g. storage 803) or stored information on the server 804 (e.g. storage 805) to determine the individual(s) or transmitter(s). The processor 402 may verify the individual(s) or transmitter(s) alone, or may send the collected information to the server 804 for further processing or comparison. For example, the processor 402 may compare a detected license plate number with a database of license plate numbers stored on the storage/memory device of the GDCM system. Upon verification, the processor 402 may transmit the information to an individual, transmitter 603 (or wireless user device). The processor 402 may also collect information from the server 804 to verify or determine the individual(s), vehicle(s), or transmitter(s).

In blocks 507, 509, 511, and 513 the processor 402 and server 804 may perform any of the actions individually or together simultaneously to collect and provide wireless device users with comprehensive visual, audio, and motion information. The GDCM system may use the collected visual, motion, and audio information to open, close, or partially open the garage door in response to a combination of actions or events, or motion, visual, or audio triggers.

For example, an individual may leave for work at set times in the day during a work week. Once the individual opens the garage door several events take place that may be collected and processed by the GDCM system and/or server 804. The GDCM system may collect transmitter/wireless user device information (e.g. its proximity to the GDCM system). The GDCM system may collect visual vehicle information (e.g. license plate, individual's facial features). The GDCM system may determine the individual based on the collected information, and the GDCM system may determine the individual is leaving the garage. The GDCM system may close the garage door in response to processed visual information through the server 804 or processor 402 showing the vehicle leaving. The GDCM system may then notify the transmitter(s)/individual(s) that a certain individual has left the garage. Thus, the GDCM system may be programmed to make certain future determinations or actions based on collected visual, motion, and audio information.

Referring to FIG. 5B, another exemplary method of using the GDCM system (e.g. for monitoring garage door status and communicating to users) begins at block 520.

In block 521, the garage door status is monitored periodically for visual, motion, and audio triggers. Monitoring interval or intervals of the garage door status may be defined by the user or wireless user device. The user may define monitoring intervals using an application. The user may also leave monitoring to default value(s) as determined by the GDCM system, the default settings in the application, or the server 804. The user may set monitoring intervals however they wish. The user may define garage door status monitoring to be at 10 minute intervals throughout the day, 24-hour monitoring, weekend, morning, afternoon, or evening monitoring only, etc. The monitoring intervals may also be automatically adjusted based on a recently triggered event, so that the individual or user may be properly informed when the GDCM system detects additional events based on stored or acquired visual, motion, or audio information.

In block 523, the processor 402 of the GDCM system, the server 804, or both may be used to detect changes in the garage door status (e.g. opened, closed, or partially opened). The processor 402 may use, for example, visual information collected from the camera 413 and motion sensors 416 to determine whether the garage door has moved. The processor 402 may then send this information directly to a wireless user device or server 804 for additional processing.

As shown in block 525, the server 804 and/processor 402 may perform an action of closing the garage door or preventing the garage door from opening. The processor 402 and/or server 804 may immediately perform an appropriate action, notify the wireless user device 901 of the action taken, and then prompt the user for additional action, scheduling, monitoring, etc.

In block 527, the GDCM system may then communicate the status of the garage door to the server 804 and/or wireless user device(s) 901.

In block 529, the GDCM system notifies the wireless user device(s) 901 of the action taken by the server 804 or processor 402 and requests from the user further action or additional appropriate action. The user may also set the notification to silent, verbose, delayed, etc.

In block 531, in case the GDCM system detects an individual, the user may communicate through a stored or automated response (e.g. a action of playing a greeting, or custom voice message) from the server 804, or the user may communicate through the wireless user device 901 by using the speaker 414 and microphone 415 of the GDCM system.

In block 533, the user may perform a third action such as playing a message or recording from the application, or sending an audio file for the GDCM system to play, the user may perform a series of actions such as a greeting, playing a message, speaking with the individual and then opening, closing, or partially opening the garage door. The user may also create a list of actions to be performed, or program the server 804 or GDCM system to automatically process a list of actions.

The GDCM system may attempt to determine the individual(s) based on stored visual or motion information on the GDCM system. The GDCM system may send visual and motion information of the individual(s) to the server 804 for further processing. Finally, the wireless user device 901 receives visual and motion information, and the user may flag or define the individual(s) and authorize the GDCM system to open, close, or partially open the garage door.

If the individual(s) is known or defined, the GDCM system or server 804 may process an action or list of actions for communicating with the individual(s).

If the individual(s) is unknown, the wireless user device 901, the GDCM system and/or server 804 will prompt the user through an application to define the individual.

In cases where collected information about the individual(s) signals of present danger for the user or residents (e.g. glass breaking at night), the GDCM system may transmit visual, audio, or motion information to the server 804 and wireless user device(s) to notify the authorities.

The server 804 may attempt to determine whether the individual(s) is known or defined (e.g. a known visitor, a post office worker, a delivery person, or a neighbor, etc.). Information about the individual may be communicated to the server 804 by SMS, text, email, etc. For example, the server 804 may receive information about a large item delivery from a user(s) email and determine based on delivery time and/or facial information from other smart devices to open or partially open the garage door to receive a package. The server 804 may prompt the user to authorize opening of the garage door.

The individual's visual information may comprise of facial features for facial recognition (e.g. appearance of nose, eyes, ears, etc.), body type and shape, height, skin color, hair color, clothing type, shoes, socks, etc. The individual's information may also comprise of a portion of portions of the head, arms, legs, feet, torso, etc. Any of the individual's visual information may be used to determine or define the individual.

The processed motion and visual information (e.g. facial recognition) may be used by the server 804 to select from a list of voice messages for communicating with the individual(s). For example, communication may comprise of a means to guide or interact with a visitor, a post office worker, a delivery person, a neighbor, etc.

Referring to FIG. 5C, another exemplary method of using the GDCM system (e.g. for monitoring garage door status and communicating to users) begins at block 540.

In block 541, the wireless user device(s) 901 is provided with access to visual, audio, or motion information collected from the GDCM system through a local network or a server 804 connection.

In block 543, the wireless user device(s) 901 performs an action from a list of actions that is then communicated to the GDCM system through the server 804 or local network.

In block 545, the wireless user device(s) 901 is notified of the completed action and/or prompted for further action or additional appropriate action.

In block 547, motion, audio, or visual information collected by the GDCM system is provided to the wireless user device(s) 901, server 804, or both for further processing.

As with FIGS. 5A and 5B, in blocks 541, 543, 545, and 547, the processor 402 and/or server 804 may present the wireless user device(s) 901 with real-time information of the status of the door. The wireless user device 901 may be used to control the garage door at any time through the GDCM system. The user may open, close, partially open, or perform any appropriate action or action as described above.

[Proximity Information (Geofencing—Entering the Garage)]

Figure 6:
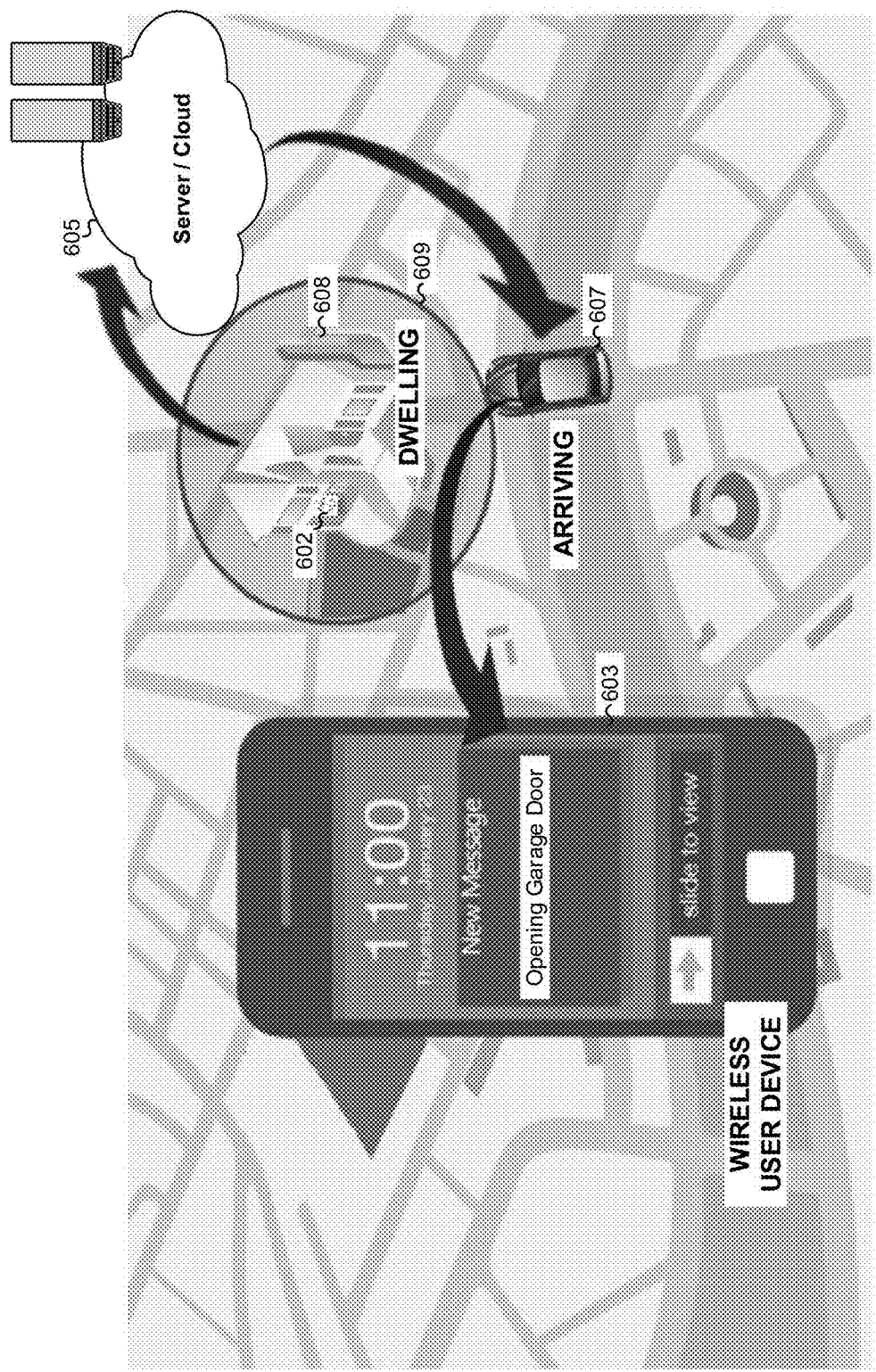
FIG. 6 illustrates an exemplary embodiment of proximity detection and geofencing of the GDCM system of FIG. 2.

Referring to FIG. 6 as an exemplary embodiment of a GDCM system 602 for carrying out the exemplary process described in FIG. 5A. The wireless user device 603 transmits location or proximity information to the server/cloud 605. The server/cloud 605 may use, for example, WiFi™ connection information or GPS location information transmitted by the wireless user device 603 to the server 605 by an application to determine the proximity of the wireless user device 603 to the GDCM system 602. The server 605, upon determining the wireless user device 603 is approaching (e.g. is within a proximity to) the GDCM system 602, instructs the GDCM system 602 to perform an action of opening the garage door of the dwelling 608.

As shown in FIG. 6, as a vehicle 607 approaches a geo-boundary or geofence 609 defined by the GDCM system 602, the wireless user device 603 receives a notification from the server 605, or from the GDCM system 602 if the user is connected to the local wireless network, that the garage door is opening. The vehicle 607 crossing the geofence 609 may also function to trigger a notification and then a delayed response from the server 605 or GDCM system 602, such that the vehicle speed, trajectory, and location, may be used to predict the arrival time of the vehicle 607 to the dwelling 608. The arrival time of the vehicle 607 to the dwelling 608 may be learned by the server 605 and stored on the GDCM system 602 for improving the GDCM system 602 response, convenience, and security for the user or resident. For example, after a few instances of determining the wireless user device 603 location information based on driving behavior or trajectory, the GDCM system 602 receives updated location information from the server 605, the server 605 may then send instructions to the GDCM system 602 to open the garage door after the wireless user device 603 has crossed the geofence 609 and is within about 50 meters of the garage door.

The radius of the geofence 609 may be determined by the server 605 or defined by the user. The radius information may be stored on the server 605 and the GDCM system 602. When the vehicle 607 enters the garage after crossing the radius of the geofence 609, vehicle and individual information may further be substantiated by collecting visual, audio, or motion information from sensors of the GDCM system 602. The processor of the GDCM system 602 may then process the collected information and transmit to the server 605. The GDCM system 602 may collect visual information about the passengers and vehicle 607 such as, for example, the facial recognition of driver and front passenger, vehicle color, type, and license plate number, etc.

In determining whether a single wireless user device 603 or multiple devices are within a proximity of the GDCM system 602, the processor of the GDCM system 602 may use one or a combination of the above information (e.g. visual, proximity, audio, or motion information). The processor may pass this information to the server 605 for further video, image, audio, or motion analysis and processing. The processor and/or the server 605 may use any of the disclosed methods to acquire individual and vehicle information to improve accuracy of the location of the wireless user device 603, and/or to predict the location of the wireless user device 603. The processor may also use a scheduling system, an action, or any of the disclosed means to routinely check the garage door status and to send the garage door state to the wireless user device 603 or individual. Furthermore, the individual may define a preferred routine for checking the garage door state and/or submitting acquired and/or processed video, image, audio, or motion information. Similarly, the processor of the GDCM system 602 and/or server 605 may use multiple sources of wirelessly communicable information (e.g. WiFi™, GPS, Bluetooth, infrared, sonar, biometric information, etc.) to determine whether the wireless user device 603 or individual is within a proximity or predetermined distance from the GDCM system 602.

[Visual Information as Proximity Information (Geofencing—Leaving Garage)]

Figure 7:
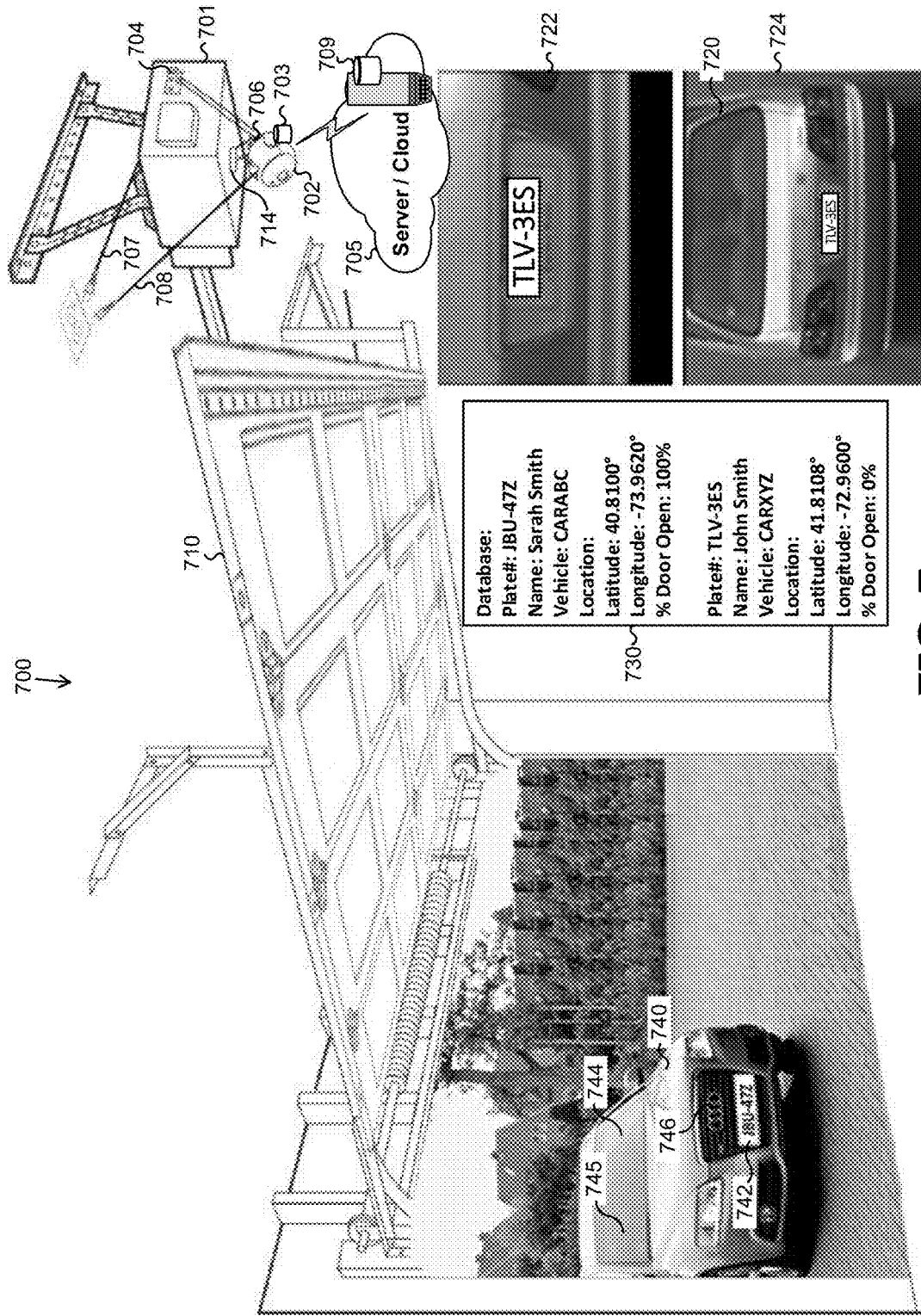
FIG. 7 illustrates an exemplary embodiment of image recognition, proximity detection, and geofencing of the GDCM system of FIG. 2.

Referring to FIG. 7 as an exemplary embodiment of a GDCM system 702 for carrying out the exemplary processes described in FIGS. 5A-5C in a garage door opener system 700 using the GDCM system 702 and server 705. The garage door opener system 700 includes the GDCM system 702 powered through a power supply cable 708. The GDCM system 702 is magnetically coupled to a garage door opener 701 through a magnetic base 714. The GDCM system 702 having at least one connection terminal 706 for connecting to and controlling the garage door opener 701 powered through a power supply cable 707. The magnetic base 714 may include power and communications connections such that the GDCM system 702 may be easily attached and detached from the magnetic base 714. The magnetic base 714 may also include wireless charging and communication such that the GDCM system 702 may be coupled to or decoupled from the magnetic base 714.

The user, server 705, or processor of the GDCM system 702 may create event triggers based on collected audio, proximity, motion, or visual information by the GDCM system 702. The GDCM system 702 may collect such information at predetermined times based on a scheduling system defined by the user, or in response to an event trigger such as manual or automated opening or closing of the garage door 710 as detected by the camera 413 of the GDCM system 702. The event trigger may be defined as an opening, partially opening, or closing of the garage door 710, or an approaching or departing vehicle 740 or wireless user device within the vehicle 740 as determined by the server 705 or the GDCM system 702. For example, a user leaving the garage may open the garage door 710 triggering an event trigger, the camera 413 of the GDCM system 702 may collect proximity and user information from the transmitter or wireless user device, and visual features of the individual. As the vehicle 740 leaves the garage, the GDCM system collects vehicle information (e.g. license plate number 742) to determine or further substantiate the detected individual or wireless user device. The events and collected information may be stored in a database 730. The database 730 may be stored and shared between the storage device 703 of the GDCM system 702 and the storage device 709 of the server 705.

As shown in FIG. 7, the database 730 comprises of vehicle and individual information, for example, license plate information, driver name, vehicle/wireless user device information (e.g. user, account information), proximity and location, and the percentage of the garage door 710 being opened, but need not be limited to this information. The database 730 may comprise of collected video or motion information of the driver 744 and passengers 745. The server 705 and the GDCM system 702 may together determine the individual based on the user account, wireless user device, vehicle, and facial recognition of the individual. The user may also define and store the collected information of the vehicle or individual in the database of storage device 703 and 709. The user may define a set of family members, residents, and vehicles to exclude from notification, monitoring, or may choose to include such information to be monitored and reported by the GDCM system 702 and server 705.

As described above, the event trigger prompts the server 705 and GDCM system 702 to begin to collect and process visual information for visual triggers. The processor may also create or respond to visual triggers based on collected audio, motion, or visual information by the GDCM system 702 or defined visual triggers by the server 705 without event triggers and user or server 705 intervention. The visual triggers may include motion of an object or person into or out of the garage with the garage door 710 open, partially open, or closed. Wireless user devices or transmitters may then be notified and prompted for a response. As described above, many other sensory information detection and analysis may be combined to determine individuals, and the present disclosure should not be limited to only visual information detection and analysis for determining the individual(s) or transmitter(s) detected.

As shown in FIG. 7, the GDCM system 702 may scan for a set of visual triggers based on visual information from an event trigger, for example, vehicle 740 entering a garage through garage door 710 or vehicle 720 exiting the garage. To improve the accuracy of the detected individual, the GDCM system 702 may use a combination of sensory information in addition to proximity information. For example, the GDCM system 702 may collect visual information from the entering vehicle 740. The camera 413 of the GDCM system 702 may collect visual information comprising of license plate number 742, car symbol 746, car height 724 and color 722, as well as the driver 744. The motion sensor of the GDCM system 702 may detect infrared or heat signatures of the driver 744 and passengers 745. In addition to visual and motion information, the microphone of the GDCM system 702 may collect audio information from the entering vehicle 740 or 720, or from individual(s) entering or leaving the garage. Voice recognition may be stored and used by the GDCM system 702 and/or server 705 to create an audio signature of the driver 744, the passengers 745, and vehicle 740 or 720 to determine the vehicle, the drivers, the passengers, the guests, the residents, etc. Similarly, when the vehicle 740 or 720 is exiting the garage, the GDCM system 702 may determine the individual(s)/transmitter(s) based on the last location or proximity information, license plate information, and vehicle information.

The GDCM system 702 may consolidate visual, audio, and motion information into database 730 and share database 730 information with server 705 for further processing. The server 705 may create zones based on the outline of vehicle 720 or vehicle 740. The vehicle 740 or vehicle 720 may be flagged based on the driver so that the server 705 and/or transmitter may determine who has left or entered the garage. The individual may define the vehicles or flag the vehicles stored on the server 705. The server 705 will then process the type of vehicle and attempt to discern the vehicle information (e.g. model, make, type). Additionally, facial recognition may be used together with license plate recognition to determine the driver 744 and passenger 745 within the vehicle 740. The server 705 may then process information sent from the GDCM system 702 to notify individual (s)/transmitter(s) of vehicles entering or exiting the garage based on, for example, location or proximity information, license plate information, and vehicle information.

The processor of the GDCM system 702 may use stored visual information to determine individual(s) entering or leaving the garage based on facial recognition, clothing, attire, etc. The server 705 and processor may contain facial recognition and image recognition software to process and analyze individual features. The facial information of individuals may be stored on a server 705, on the GDCM system 702, or both. The processor and server 705 may exchange facial information about an individual to aid in the accuracy of determining the individual, to create event or visual flags about the facial information of the individual, and automate the process of opening and closing the garage door 710 in response to facial information about the individual.

The individual's information may comprise of facial features, clothes, eye and hair color can be collected through an application and sent to the server 705 to determine the individual under low light conditions (e.g. during the early morning or the evening). For example, the wireless user device may send the individual's information through the application to the server 705. The server 705 may then define the individual's appearance in well-lit and low light conditions from day through night.

Thus, any means may be used to determine whether an object or person is within a proximity of the GDCM system 702, for example, using Electric Field Proximity Sensing (EFPS) to determine whether a person or object is nearby or behind a wall, or using facial recognition analysis, either by processor alone or a combination of server and processor, to determine the individual from one or any combination of visual, audio, or motion information.

In the above examples, the GDCM system 702 itself may also be programmed to use additional metrics or analytical means to determine the location of a transmitter, or may obtain such additional programming from the server. The methods, routines, process, subroutines may be contained within internal memory or external memory as described above. Furthermore, various video analytics and algorithms may be used to determine the content and significance of visual information acquired from the camera 413 of the GDCM system 702.

Figure 8:
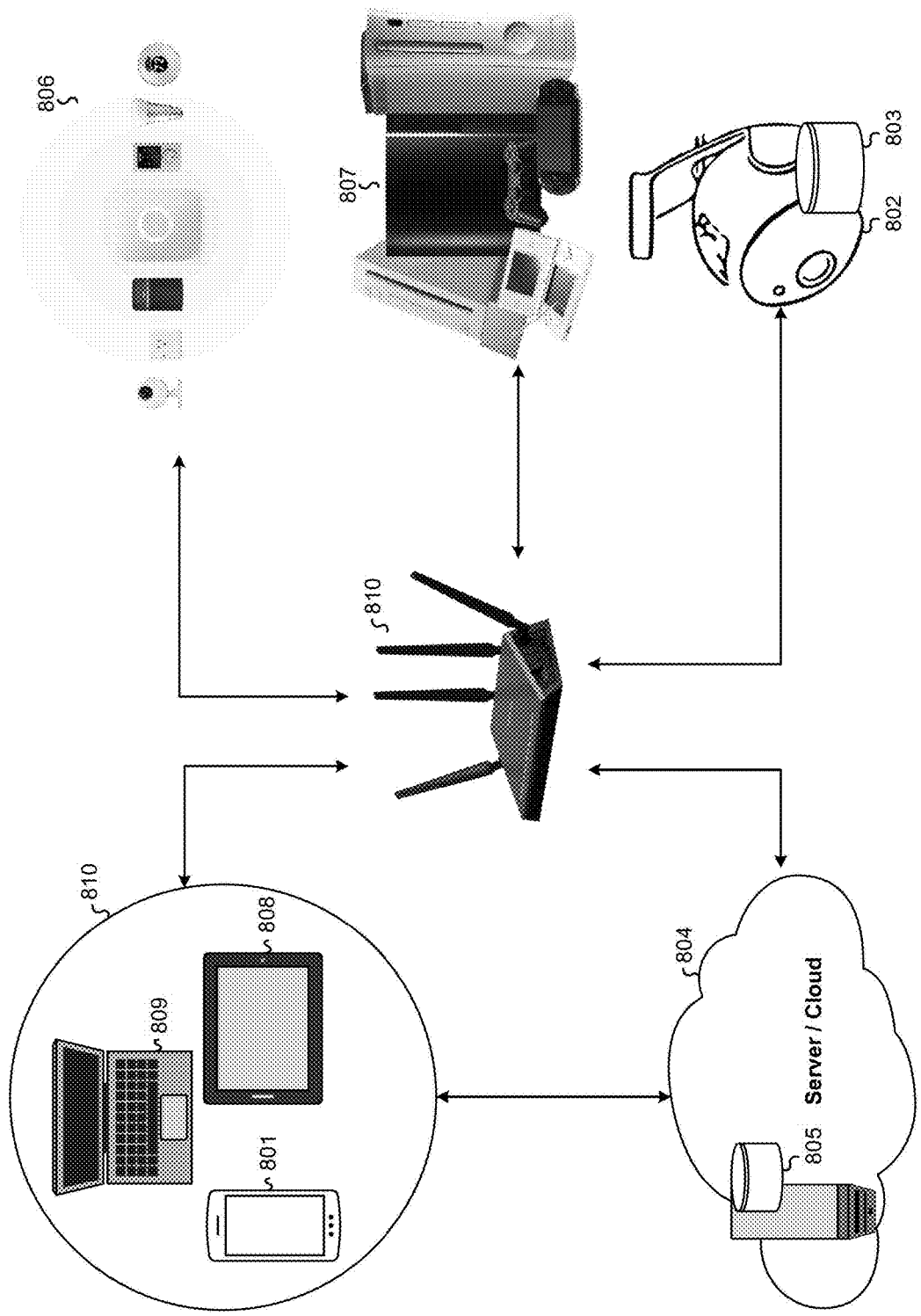
FIG. 8 illustrates an exemplary embodiment of the GDCM system of FIG. 2 communicating with other smart or wireless electronic devices.

FIG. 8 illustrates an exemplary embodiment of the GDCM system 802 wirelessly communicating with other electronic devices through, for example, a wireless router 810. The electronic devices may be, for example, smart home devices 806, laptops 809, portable devices 808, smart phones 801, and gaming consoles 807 in a server/cloud based environment. Smart home devices 806 may comprise of electronic door locks, thermostats, light bulbs, smart switches, smart outlets, IP cameras, smoke detectors, smart blinds, smart refrigerators, smart washer/dryer, smart devices powered on solar energy, etc.

The GDCM system 802 may be configured to wirelessly communicate and cooperate with smart devices 806 in real-time. Additionally, the GDCM system 802 may communicate with smart devices 806 based on stored visual, motion, or audio information in storage 803. The server 804 may prepare a second action in response to a measured physical quantity from the surrounding environment as captured by the smart device 806 and stored as visual, motion, or audio information in storage 805.

The GDCM system 802 may be configured to communicate between the above electronic devices (e.g. security devices, smart devices, or smart appliances) by sending and retrieving proximity information, schedule information, textual (e.g. email, SMS, MMS, text, etc.), visual, motion, or audio information, as well as user access information shared between electronic devices. For example, the GDCM system 802 may be configured to be notified by these smart devices 806 of mailmen, delivery personnel, guests, or friends entering or leaving the premises of the building. Notification of an incoming delivery, mailman, guests or friends may be made through text, email, visual, or audio information provided by a wireless user device 801 (e.g. email of a delivery forwarded from an email account or App to the application) or any of the electronic devices above to the GDCM system 802. Once a smart device 806 detects and individual or object, the information may be relayed to the GDCM system 802, then to a server 804 or transmitter (e.g. smart phone or smart TV) to respond by performing an action. Similarly, the smart devices 806 may notify users of collected sensory information from the GDCM system 802 and prompt users to control the garage door via the GDCM system 802. In this way, the GDCM system 802 is a hub for collecting and processing information from other electronic devices then prompting the server or wireless user device for control instructions to open, close, or partially open the garage door.

Figure 9:
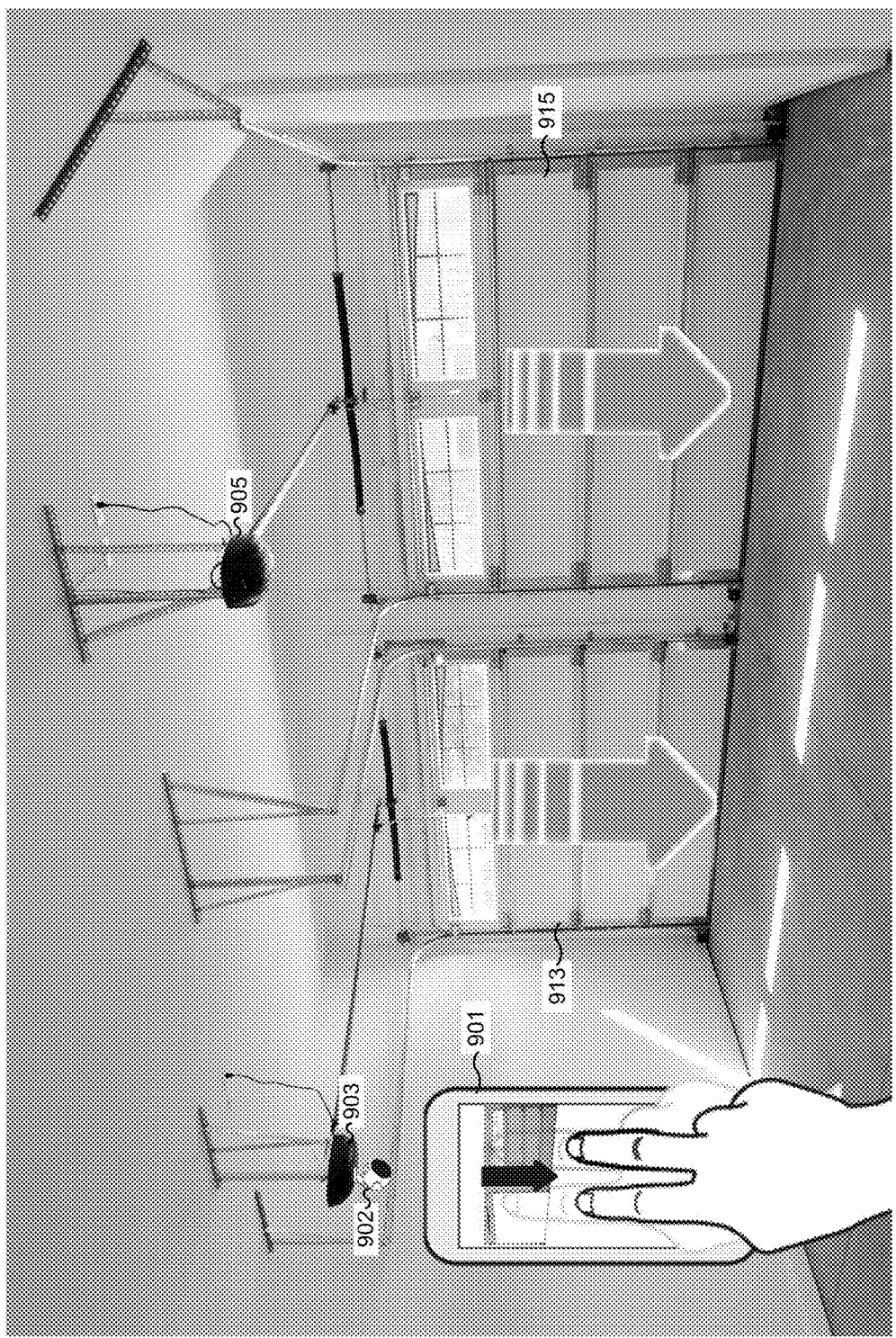
FIG. 9 illustrates an exemplary embodiment of the GDCM system of FIG. 2 being controlled by gestures by a wireless user device.

FIG. 9 illustrates an exemplary embodiment of the GDCM system 902 communicatively coupled to and receiving control signals from a wireless user device 901. As in FIGS. 2-3 and 7, the GDCM system 902 may be communicatively coupled to two garage door openers 903 and 905 through the at least one connection terminal of the GDCM system 902. As disclosed in FIGS. 3 and 5A, the GDCM system 902 may be communicatively coupled to garage doors openers 903 and 905 through an at least one connection terminal. Moreover, the connection(s) may not need to be limited to a wired connection. The GDCM system 902 may include various means of physical (e.g. 1-wire, 2-wire, 3-wire, etc.) or wireless (e.g. a dongle, or an RF transmitter) connection to the garage door openers 903 and 905 to facilitate remote operation of more than one garage door. The GDCM system 902 may be coupled to multiple garage door openers to function as a two channel, two garage door opener, three channel, three garage door opener, etc.

In response to gestures on the display of the wireless user device 901, the GDCM system 902 controls garage doors 913 and 915 through garage doors openers 903 and 905, respectively. As shown in FIG. 9, a two finger down swipe on the wireless user device 901 may be used to close both garage doors 913 and 915. Similarly, a two finger up swipe may be used to open both garage doors 913 and 915. A single finger swipe on a single door 913 or 915 displayed on the wireless user device 901 controls the single door 913 or 915 to open or close. The user may see the status of both garage doors 913 and 915, and simultaneously control a single garage door or multiple garage doors to open or close using a single or two finger swipe down or up swipe over a live image of garage doors 913 and 915.

Definitions and Non-Limiting Language

A transmitter may be a smart device, a smart phone, a vehicle, a tablet, a laptop, a TV, or any electronic device capable of wirelessly connecting to a network or joining a wireless network. The transmitter may be wirelessly and communicably associated to an individual either through a network or server (e.g. through a user account on the server, or WiFi' login information), or through visual information collected by the GDCM system. The terms transmitter, individual, wireless user device, and user may be used interchangeably throughout the present disclosure.

A wireless user device may be used interchangeably with the term transmitter. However, a wireless user device comprises of a transmitter having a display or user interface for facilitating wireless communication between a user and an electronic device (e.g. a computer system). Some examples of wireless user devices comprise of a tablet, smart phone, PDA, laptop, navigation device, etc.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or files over a network. The server may be any computer configured to act as a server (e.g. a desktop computer, or single or multiple rack-mountable servers) and accessible remotely using remote access software.

Proximity determination may be made by using geofencing and a combination of visual, motion, and audio information. Geofencing may be defined as a virtual perimeter for a real-world geographic area. Geofencing may be accomplished using location aware devices through, for example, GPS, RFID technology, wireless network connection information, cellular network connection information, etc. Visual, motion, and audio information may be collected by the GDCM system or server to substantiate a user(s)/transmitter(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, MD interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching vehicle as the vehicle nears at least one garage door opener, or the distance of a departing vehicle as the vehicle moves further away from the at least one garage door opener. The predefined distance may be defined as between about 1 meter and about 2000 meters.

An action (e.g. first, second, third, etc.) may comprise of a single action, set of actions, or a list or blend of actions based on one or more of: a proximity of a transmitter, a time of day, visual, motion, or audio information, a schedule, user(s) preferences, and the state of the garage door, as will be described above. The action may be any one of: opening the garage door, closing the garage door, or partially opening the garage door. The action may also include playing a music file, sound file, greeting, or message in response to a detected change in the garage door status, or in response to a detected or defined audio, proximity, visual, or motion trigger. The action may also comprise of controlling other smart devices as communicated through the GDCM system or server, for example, turning on a light fixture, outlet, and communicating with transmitter(s), wireless user device(s), or the detected individual(s). The action may also comprise of sending an email, text, or SMS to transmitters, individuals, smart devices, or wireless user device(s).

A garage door being partially opened may be defined by a percentage of openness of between about 1-99%. Where partially opening the garage door to about 99% means the garage door is about completely open, and partially opening the garage door to about 1% means the garage door is about completely closed. In response to any of the above actions, the action may also comprise of closing the garage door to a maximum point possible for safety, privacy, or security. The server, user, transmitter, or wireless user device may perform any action or series of actions to achieve convenience, safety, security, or privacy for the user, resident, or tenant.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the GDCM system 400, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A garage door controller and monitoring (GDCM) device comprising:
    at least one memory;
    a processor, coupled to the at least one memory;
    at least one connection terminal;
    a network module, the network module coupling the GDCM device to a local wireless network;
    wherein the at least one connection terminal is communicably coupled to at least one garage door opener; and
    wherein the processor is configured to cause a first action based on a determination of a proximity of a transmitter to the at least one garage door opener; wherein the proximity of the transmitter to the at least one garage door opener is determined by the processor using at least one of geofencing technology, image recognition technology, voice recognition technology, or predicted or learned user behavior from one or more interactions with the transmitter and/or one or more electronic devices; and
    wherein prior to performing the first action:
    the processor acquires visual information of the status of one or more garage doors and the occupancy of the one or more garages associated with the at least one garage door opener using the image recognition technology, and wherein the processor provides feedback to the transmitter upon acquiring the visual information; and
    wherein in response to providing feedback to the transmitter, the processor receives feedback from the transmitter prior to performing the first action.

2. The GDCM device of claim 1, wherein the first action is at least one of moving the at least one garage door opener to an open position, a closed position, a partially open position or partially closed position.

3. The GDCM device of claim 2, wherein the transmitter is communicably coupled to a server and wherein the server is communicably coupled to the local wireless network.

4. The GDCM device of claim 3, further comprising at least one sensor, wherein the at least one sensor is one of a speaker, a microphone, a camera, or a motion sensor and wherein the at least one sensor enables the image recognition technology or the voice recognition technology.

5. The GDCM device of claim 4, wherein the at least one sensor includes a camera, and the camera acquires images in low-light conditions.

6. The GDCM device of claim 4, wherein the at least one sensor acquires at least one of a vehicle information or an individual information; wherein the vehicle information comprises of at least a license plate number, and the individual information comprises of at least a portion of the individual's torso and head.

7. The GDCM device of claim 5, wherein the vehicle information and the individual information are compared against a database of stored vehicle information and individual information on the server or an at least one memory of the GDCM device.

8. The GDCM device of claim 1, further comprising a magnetic base, wherein the magnetic base is coupled to the bottom surface, the track, or the rail of the at least one garage door opener, and wherein the at least one connection terminal is communicably coupled to the at least one garage door opener by sharing an existing connection with a manual switch of the at least one garage door opener.

9. The GDCM device of claim 8, wherein the GDCM device is configured to perform actions simultaneously on a plurality of garage door openers.

10. A method comprising:
connecting at least one connection terminal of a GDCM device to an at least one garage door opener;
connecting the GDCM device to a local wireless network;
determining a proximity of a transmitter to the at least one garage door opener; and
performing a first action based on the determining of the proximity of the transmitter;
wherein determining the proximity of the transmitter utilizes at least one of geofencing technology, image recognition technology, voice recognition technology, or predicted or learned user behavior from one or more interactions with the transmitter and/or one or more electronic devices; and
wherein prior to performing the first action:
the processor acquires visual information of the status of one or more garage doors and the occupancy of the one or more garages associated with the at least one garage door opener using the image recognition technology, and wherein the processor provides feedback to the transmitter upon acquiring the visual information; and
wherein in response to providing feedback to the transmitter, the processor receives feedback from the transmitter prior to performing the first action.

11. The method of claim 10, wherein the first action is at least one of moving the at least one garage door opener to an open position, a closed position, a partially open position or partially closed position.

12. The method of claim 11, further comprising acquiring at least one of a vehicle information or an individual information; wherein the vehicle information comprises of at least a license plate number, and the individual information comprises of at least a portion of the individual's torso and head.

13. The method of claim 12, further comprising comparing the at least one of vehicle information or the individual information against a database of stored vehicle and individual information on the server or an at least one memory of the GDCM device.

14. The method of claim 13, further comprising performing actions simultaneously on a plurality of garage door openers.

15. The method of claim 10, wherein the connecting at least one connection terminal of a GDCM device to at least one garage door opener comprises of coupling magnetically the GDCM device to a bottom surface, the track, or the rail of the at least one garage door opener.

16. A non-transitory machine-readable medium comprising instructions stored therein, which, when executed by one or more processors of a processing system cause the one or more processors to perform operations comprising:
determining a proximity of a transmitter to at least one garage door opener; and
determining a first action based on the determining of the proximity of the transmitter;
wherein determining the proximity of the transmitter utilizes at least one of geofencing technology, image recognition technology, voice recognition technology, or predicted or learned user behavior from one or more interactions with the transmitter and/or one or more electronic devices; and
wherein prior to performing the first action:
the processor acquires visual information of the status of one or more garage doors and the occupancy of the one or more garages associated with the at least one garage door opener using the image recognition technology, and wherein the processor provides feedback to the transmitter upon acquiring the visual information; and
wherein in response to providing feedback to the transmitter, the processor receives feedback from the transmitter prior to performing the first action.

17. The non-transitory machine-readable medium of claim 16, wherein the first action is at least one of moving a garage door opener to an open position, a closed position, a partially open position or partially closed position.

18. The non-transitory machine-readable medium of claim 17, wherein the operations further comprise of acquiring at least one of a vehicle information or an individual information; wherein the vehicle information comprises of at least a license plate number, and the individual information comprises of at least a portion of the individual's torso and head.

19. The non-transitory machine-readable medium of claim 18, wherein the operations further comprise of comparing the at least one of vehicle information or the individual information against a database of stored vehicle and individual information on a server or an at least one memory of a GDCM device.

20. The non-transitory machine-readable medium of claim 19, wherein the operations further comprise of performing actions simultaneously on a plurality of garage door openers.

21. The non-transitory machine-readable medium of claim 20, wherein the GDCM device is connected to the at least one garage door opener by coupling magnetically the GDCM device to a bottom surface, the track, or the rail of the at least one garage door opener.

* * * * *